United States Patent
Smith et al.

(10) Patent No.: US 6,854,065 B2
(45) Date of Patent: Feb. 8, 2005

(54) LOADSHEDDING UNINTERRUPTIBLE POWER SUPPLY

(75) Inventors: Robert B. Smith, Loveland, CO (US); Bradley D. Winick, Fort Collins, CO (US); Edward A Cross, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 662 days.

(21) Appl. No.: 09/918,767

(22) Filed: Jul. 30, 2001

(65) Prior Publication Data

US 2003/0023888 A1 Jan. 30, 2003

(51) Int. Cl.[7] ............................................. G06F 1/30
(52) U.S. Cl. ..................... 713/300; 713/330; 713/340
(58) Field of Search .............................. 713/300, 310, 713/330, 340

(56) References Cited

U.S. PATENT DOCUMENTS

| | | | | |
|---|---|---|---|---|
| 4,748,340 A | * | 5/1988 | Schmidt ........................ 307/53 |
| 5,939,799 A | * | 8/1999 | Weinstein ...................... 307/64 |
| 6,170,062 B1 | * | 1/2001 | Henrie ......................... 713/340 |
| 6,175,510 B1 | * | 1/2001 | Loh ............................. 363/37 |
| 6,178,515 B1 | * | 1/2001 | Hayashi et al. ............. 713/300 |
| 6,184,593 B1 | * | 2/2001 | Jungreis ....................... 307/64 |
| 6,191,500 B1 | * | 2/2001 | Toy ............................. 307/64 |
| 6,629,252 B1 | * | 9/2003 | Gholami et al. ............ 713/401 |

* cited by examiner

*Primary Examiner*—Dennis M. Butler

(57) ABSTRACT

A dual power source system includes a first power source and a second power source operably coupled with an electrical device, as well as a switching mechanism capable of selecting between the first and second power sources. An uninterruptible power supply (UPS) is place in line with one of the first and second power sources leading to the electrical device. Sense circuitry is capable of identifying a power failure condition in either the first or second power sources. A controller utilizes signals from the sense circuitry to selectively switch between the first and second power sources while configuring the UPS in a manner of providing for a plurality of operational states that accommodate the electrical device with operational power despite any combination of power failures in the first and second power sources.

13 Claims, 2 Drawing Sheets

LOADSHEDDING UNINTERRUPTIBLE POWER SUPPLY

BACKGROUND OF THE INVENTION

1. Field of the Invention

The invention pertains to the field of uninterruptible power supplies (UPS) for use in providing continuous power to electrical devices in the event of a primary power system failure. More specifically, the UPS is adapted for use in systems having two primary sources of power in addition to the UPS.

2. Discussion of the Related Art

UPS devices are useful in preventing unwanted failure in electrical devices due to failure of an incoming power source. For example, a power utility company for a state or municipality may have a large industrial facility for converting energy from fossil fuels into electrical power. The resultant electricity travels on power transmission lines until the electricity arrives at an ultimate point of use. Frequently, the transmission of power to the ultimate end point of use is disrupted, e.g., by a rolling blackout or weather conditions that damage the power transmission lines.

Disruption of electrical power sources cannot be tolerated in situations where a continuous power source is necessary for the operation of critical electronic devices or where the disruption is likely to cause harm. For example, disruption of power to a telecommunications server for use in emergency medical situations might result in the loss of human life. Many businesses are unable to function without their computer systems in an operational state. Critical data may be irretrievably lost due to an abrupt power failure.

A variety of UPS devices are known in the art. Simple UPS devices typically act upon a sensed power loss from a single power supply and are capable of supplying power from a battery or capacitor storage device for a very limited time while a system shutdown is effected. For example, U.S. Pat. No. 5,701,244 describes a UPS that may be plugged into an alternating current (AC) receptacle for dedicated use on a personal computer. U.S. Pat. No. 6,178,515 describes a multi-processor device that automatically performs a normal shutdown of a general purpose operating system when a feed current from a main power supply is interrupted. UPS devices may be purchased from a variety of commercial sources, such as American Power Conversion of West Kingston, R.I.

The use of a dedicated UPS on a single power line does not necessarily prevent system shutdown. UPS devices are only intended to function for a limited or transient period during which the UPS discharges its stored power. For example, a UPS attached to a personal computer may diagnose a power failure condition, quick-switch to provide battery backup power, and notify the personal computer that it is necessary to commence an orderly shutdown procedure, in order to prevent the loss of critical data.

Accordingly, critical electronic systems may be provided with a plurality of power supply lines. For example, a citywide power grid may operate as a primary power source, and an auxiliary generator system may operate as a secondary power source. When there are at least two main power sources, a dedicated UPS may be deployed on each source, as is described in U.S. Pat. No. 6,191,500. This dual deployment is duplicative and thus, expensive. Failure of either power supply or either UPS can induce a shutdown of an attached electrical device when one of the UPS devices diagnoses a power failure condition, even though the other power supply or UPS may be intact and operational.

In still other alternative UPS deployments for dual power source situations, a single UPS may be coupled with more than one of the incoming power lines. The UPS may be operably configured for switching between the power sources based upon sensing of power disruption. For example, U.S. Pat. No. 5,920,129 discloses a UPS having a solid state transfer switch that is used to provide a constant source of direct current (DC) power by switching between primary and secondary sources upon sensing a voltage inversion caused by disruption of the primary source. U.S. Pat. No. 6,184,593 describes a UPS that is used to switch between a main power supply and an auxiliary generator system when the main power supply fails. U.S. Pat. No. 6,175,510 discloses a direct conversion UPS that may be used to supply power while a secondary supply comes on line. This UPS contains at least four bidirectional switches that are governed by a controller based upon sensed changes in power conditions.

A major problem with having a single UPS connected to two power sources is that the UPS is a single point of failure. Thus, failure of the UPS can cause the power disruption that is sought to be avoided.

It remains a problem to implement a single UPS to manage a dual power supply system in a manner that prevents the UPS from becoming a single point of failure.

SUMMARY OF THE INVENTION

The present invention overcomes the problems that are outlined above by providing a UPS and associated methodology for managing a dual power supply system in a manner that prevents the UPS from becoming a single point of failure. These improvements eliminate the expense of providing duplicate UPS devices in dual power systems that are designed to avoid single points of failure.

A system according to the preferred embodiments and instrumentalities described herein supplies power to an electrical device that is fitted with power couplings for use in establishing contact with a first power source and a second power source in a normal operational state. The system comprises a UPS in line between the second power source and the electrical device, but the UPS is not required to be located in line between the first power supply and the electrical device. In this context, the UPS is not considered to be in line even if the first power source is coupled to the UPS, so long as the UPS is not configured to perform power backup operations on the first power source. A switch, which is preferably but optionally located in the electrical device, permits the electrical device to consume power from a either the first power source, the second power source, or combinations thereof, such as simultaneous power consumption from the first and second power sources.

First sense circuitry is used to identify a power failure condition in the first power source. Second sense circuitry is used to identify a power failure condition in the second power source. A controller is configured with control circuitry and logic for use in implementing machine instructions for a plurality of operational states based upon sensed power failure conditions. These operational states include:

a first power source failure state occurring when the first sense circuit senses a power failure condition in the first power source and the second sense circuit does not sense a power failure condition in the second power source, whereupon the switch selects the second power source to provide power to the electrical device, a second power source failure state occurring when the second sense circuit senses a power failure in the second power source and the first sense circuit does not sense a power failure condition in the first power source, whereupon the switch selects the first power source to provide power to the electrical device and the UPS remains available to provide power if the first sense circuit senses a future power failure condition in the first power supply, and a dual source failure state occurring when the first sense circuit senses a power failure condition in the first power supply and the second sense circuit senses a power failure condition in the second power supply, whereupon the UPS provides power to the electrical device while the electrical device proceeds with an orderly shutdown.

Preferred but optional forms of the controller provide, for example, for returning the system to the normal operational state in absence of the sensed power failure condition. The controller may also comprise distributed control circuitry or logic that resides in both the UPS and the electrical device.

Preferred but optional forms of the UPS are configured to provide a signal that notifies the controller of a power depletion condition in the UPS whenever the power depletion condition arises during the second power source failure state. The controller responds to this signal by implementing an orderly shutdown of the electrical device.

It is an especially preferred feature of the system that extant commercially available components may be coupled to form the basic system in terms of its hardware components. A computer readable form may be used to adapt or retrofit the commercially available components by programming the controller to implement the respective operational states.

Another aspect of the system pertains to a method of operating the system. The method steps include:

operating in a first power source failure state that occurs when the first sense circuitry senses a power failure condition in the first power source and the second sense circuitry does not sense a power failure condition in the second power source, whereupon the switch selects the second power source to provide power to the electrical device, operating in a second power source failure state that occurs when the second sense circuitry senses a power failure in the second power source and the first sense circuitry does not sense a power failure condition in the first power source, whereupon the switch selects the first power source to provide power to the electrical device and the uninterruptible power supply remains available to provide power if the first sense circuitry senses a future power failure condition in the first power supply; and operating in a dual source failure state that occurs when the first sense circuitry senses a power failure condition in the first power supply and the second sense circuitry senses a power failure condition in the second power supply, whereupon the uninterruptible power supply provides power to the electrical device while the electrical device proceeds with an orderly shutdown.

DETAILED DESCRIPTION OF THE PREFERRED EMBODIMENTS

Figure 1:
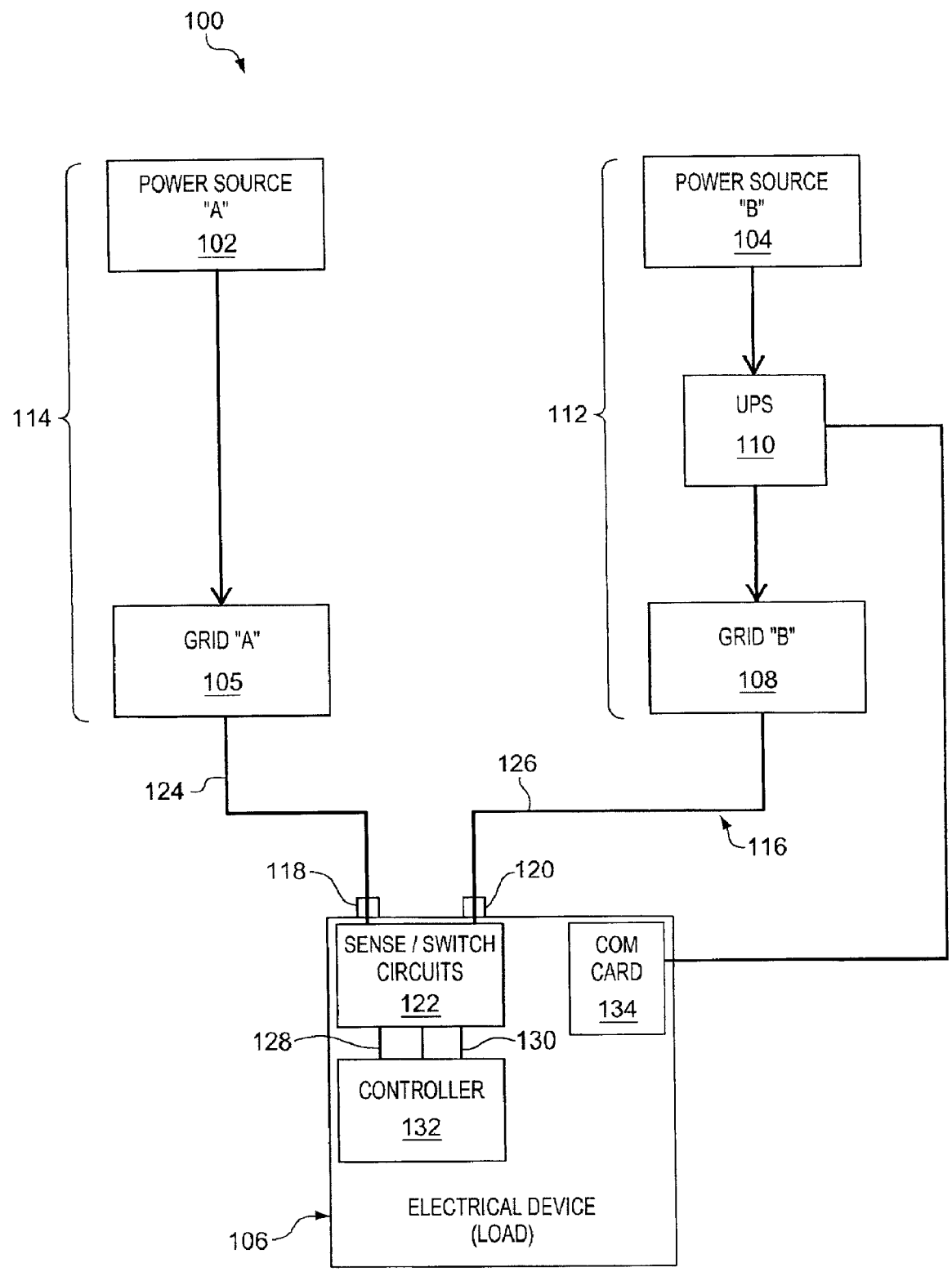
FIG. 1 is a block diagram of a dual power supply system including a single UPS that is not a single point of possible failure.

FIG. 1 shows a block diagram of a dual power source system 100. A first power source 102, which is also designated as power source "A," may be any power source, but is preferably a primary power source, such as a power transmission line that carries power originating from a power generation company. A second power source 104 may also be any power source, but is preferably a backup power source, such as an auxiliary generator or alternator system. Other types of power sources that may be used as the first or second power sources 102 and 104 include, for example, solar panels, wind charging systems, batteries, and fuel cells. Either the first power source 102 or the second power source 104 is alone capable of providing sufficient power to operate an electrical device 106, which may be any electrical device in any multiple power source system. Categories of electrical device 106 include, by way of example, telecommunications servers, computer networks, network servers, computational devices, industrial control systems, process instruments, and military weapons systems. The first and second power sources 102 and 104 may be AC or DC sources, depending upon the needs of the electrical device 106.

The first power source 102 feeds an optional first power grid 105, which is, for example, a plurality of power lines leading to the individual components of a computer network. The second power source 104 feeds an optional second grid 108, which preferably services at least a portion of the electrical devices, such as electrical device 106, that are also coupled with the first grid 108.

A UPS 110 is located in line 112 at any position in line 112 extending between the second power source 104 and the electrical device 106. As used herein, the terms "uninterruptible power supply" and "UPS" are hereby defined to include any device that receives power from a power source, stores electrical power or is capable of generating electrical power, and is configured to release the stored electrical power upon demand based upon a sensed power failure in the power source. This concept of a UPS encompasses UPS devices including conventional sense circuitry, as well as UPS devices that rely upon other sense circuitry to sense the power failure.

Especially preferred forms of UPS 110 are capable of transmitting signals, e.g., according to RS 232 protocol, that communicate the status of UPS 110. Status signals may include whether UPS 110 has sensed a power failure in power supply 104, whether UPS 110 has substantially depleted its storage power capacity, the time remaining until such depletion occurs, or whether UPS 110 is depleting its stored power. Especially preferred forms of UPS 110 are also capable of receiving control signals that configure the operational state of UPS 110, e.g., by causing UPS 110 to begin discharging its stored power, as opposed to having control logic in UPS 110 control this operation.

It is a particularly preferred feature of the invention that UPS 110 is not required to be in line with the first power source 102, and UPS 110 takes no direct action in delivering power to line 114. As shown in FIG. 1, UPS 110 is located upstream of the second grid 108 where the UPS 110 can service the entire second grid 108, however, UPS 110 can also be positioned downstream of the second grid 108 at position 116. UPS 110 is preferably provided with conventional circuitry that prevents power losses due to upstream flow of power.

The concepts disclosed herein may be implemented using a variety of commercially available hardware components.

Without limiting the broad concept of the invention, specific examples of commercially available UPS devices include, by way of example, TSi Power Corporation of Antigo, Wis.; American Power Conversion of West Kingston, R.I., and I-Bus/Phoenix Power Systems or San Diego, Calif. The electrical device 106 preferably has a plurality of internal components, though these components may be distributed to the UPS 110 or they may function as standalone components. These internal components include power couplings 118 and 120, which respectively couple the electrical device 106 with a corresponding power source 102 or 104.

It is a preferred feature of the system 100, according to its various instrumentalities, that the system 100 is provided with sense and switch circuitry 122 (sense/switch circuits), such as may be provided in a card or incorporated into a source-switching power supply (not shown). Conventional circuits according to these specifications can be obtained, for example, on commercial order from such manufacturers and suppliers as Selestica or Artesyn Technologies of Boca Raton Fla. While the specific form of the sense and switch circuits is unimportant to the broader principles of operation, they function to monitor the voltage or current on line 124 and, optionally, on line 126. The sense/switch circuits 122 may share common components, but may be conceptually allocated into a first portion 128 that is dedicated to grid 106 and line 114 and a second optional portion 130 that is dedicated to grid 108 and line 112. In the event that a voltage or current drop is detected on either line 124 or 126, the sense/switch circuits 122 provide a signal that notifies a controller 132 of a power failure condition where, for example, a power failure on line 116 indicates a failure of UPS 110.

The controller 132 receives signals from the sense/switch circuitry 122 and directs appropriate action to configure system 100 in an operational state that is responsive to the sensed power failure. This response is taken by directing the sense/switch circuitry 122 to select one of the first power source 102 or the second power source 104 for the supply of power to electrical device 106. Additionally, the controller 132 also directs the UPS 110 to place itself into an operational state that compliments the operational state of system 100, or controller 132 permits UPS 110 to place itself into the complimentary operational state.

A communications card 134 is optionally used to facilitate the transmission and receipt of signals between UPS 110, sense/switch circuits 122, and controller 132. Commercially available system components typically utilize the RS 232 protocol for transmission of these signals.

There will now be shown a diagram that demonstrates control logic for use in programming the controller 132 or, optionally, UPS 110, with machine instructions that place system 100 in a plurality of operational states based upon sensed power failure conditions.

A first power source failure state occurs when a first portion 128 of the sense/switch circuitry 122 senses a power failure condition in the first power source 102 and a second portion 130 of the sense/switch circuitry 122 (or the UPS 110) does not sense a power failure condition in the second power source 104, whereupon the sense/switch circuitry 122 selects the second power source 104 to provide power to the electrical device 106.

A second power source failure state occurs when the second portion 130 of the sense/switch circuitry 122 senses a power failure in the second power source 104 and the first portion 128 of the sense/switch circuitry 122 does not sense a power failure condition in the first power source 102, whereupon the sense/switch circuitry 122 selects the first power source 102 to provide power to the electrical device 102 and the UPS 110 remains available to provide power if the first portion 128 of sense/switch circuitry senses a future power failure condition in the first power source 102.

A dual source failure state occurs when the first portion 128 of sense/switch circuitry 122 senses a power failure condition in the first power supply 102 and the second portion 130 of sense/switch circuitry (or UPS 110) senses a power failure condition in the second power supply 104, whereupon the UPS 110 provides power to the electrical device while the electrical device 106 proceeds with an orderly shutdown.

Figure 2:
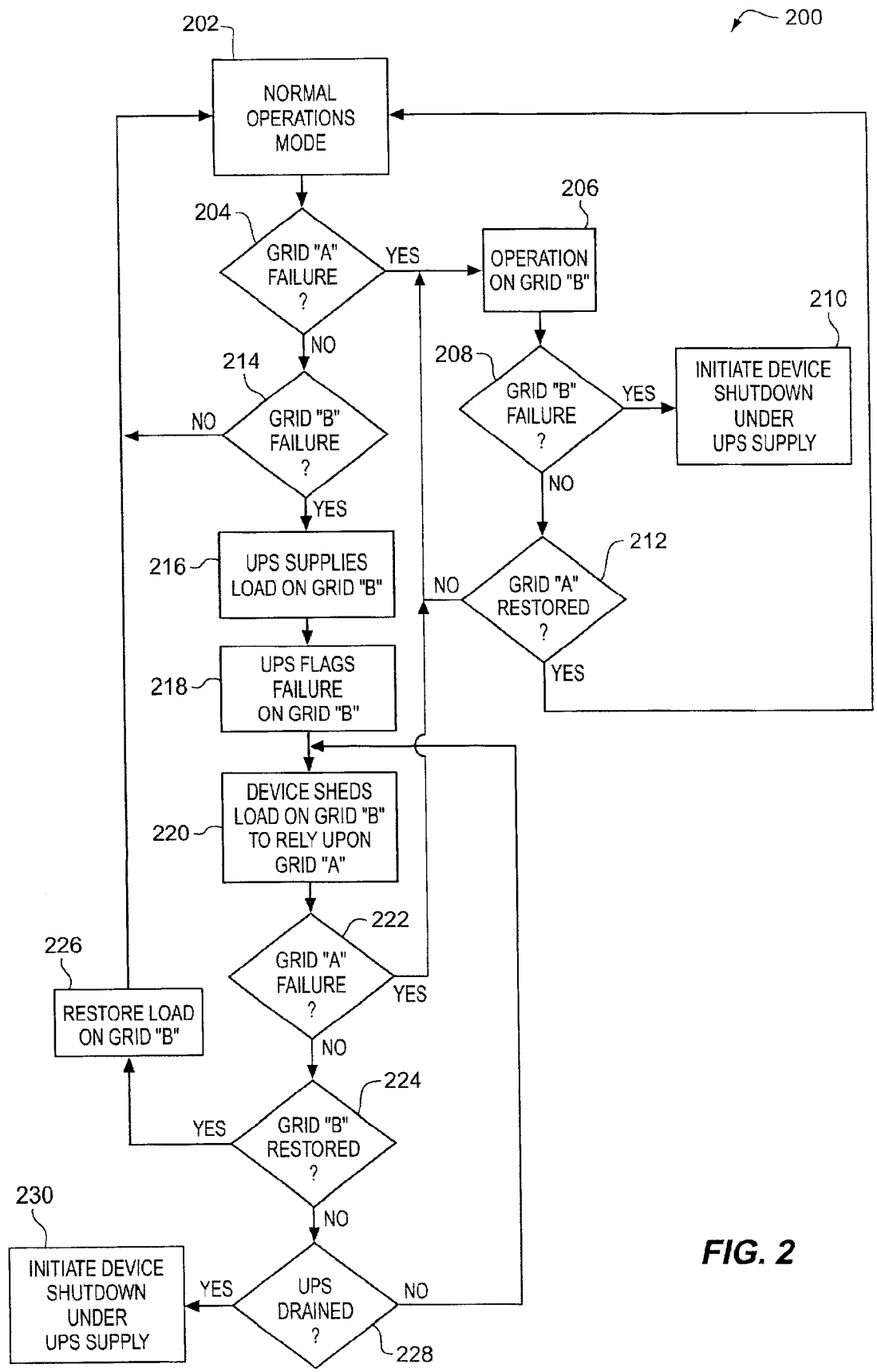
FIG. 2 is a diagram of firmware that embodies control logic for use in operating the system shown in FIG. 1 according to a plurality of operational states corresponding to sensed power failure conditions.

FIG. 2 a diagram of process 200 that is implemented by programming controller 132 and/or UPS 110 with firmware which embodies control logic processes for use in operating the system shown in FIG. 1, according to the aforementioned operational states.

Step 202 entails a normal operational state wherein the electrical device 106 and system 100 is functioning within normal design parameters. Neither the first power source 102 nor the second power source 104 have failed, and the load represented by electrical device 106 consumes power from either source or both sources simultaneously according to system design options.

In step 204, controller 132 determines whether there is a signal from the first portion 128 of sense/switch circuitry 122 indicating that there is a power failure on grid 106 or line 114.

If the result of step 204 is that power has failed on grid 106 or line 114, controller 132 initiates the first power source failure state in step 206 by directing the sense/switch circuitry 122 to select power from the second power source 104. UPS 110 may be called upon to provide temporary power while, for example, an auxiliary generator system represented by second power source 104 comes on line. While the first power source failure state of step 206 is operational, if in step 208 the second portion 130 of sense/switch circuitry 122 (or UPS 110) determines that there is an additional failure on grid 108 or line 112, controller 132 induces the dual source failure state by initiating in step 210 an orderly shutdown of electrical device 106 under power supplied by UPS 110. If no power failure is diagnosed in step 208, controller 132 determines in step 212 whether sense/switch circuitry 122 senses that power has been restored to grid 106 or line 114. If not, the operational state of step 206 continues until such time as power from the first power supply 102 is restored, whereupon system 100 returns to the normal operational state represented by step 202.

In step 204, during the normal operational state of step 202, if there has been no power failure on grid 106 or line 114, controller 132 in step 214 determines from UPS 110 (or the second portion 130 of sense/switch circuitry 122 if UPS 110 has failed) whether there has been a power failure on grid 108 or line 112. If not, the normal operational state of step 202 continues. If controller 132 determines that there is a power failure in step 214, controller 132 in step 216 optionally has UPS 110 supply temporary power to the electrical device 106, if such power is required by conditions of the normal operating state of step 202. Where UPS 110 senses a power failure on grid 108 or line 112, UPS 110 also provides a signal to controller 132 indicating the power failure condition in step 218.

Upon receipt of a signal indicating a power failure condition on grid 108 or line 112, controller 132 in step 220 commences the second power source failure state by activating sense/switch circuitry 122 for reliance upon power source 102 by switching to shed any load dependency from power supply 104 at electrical device 106.

Step 220 is followed by step 222 in which controller 132, using sense signals from the sense/switch circuitry 122, determines whether there has been a power failure on the "A" grid 106. If such failure has occurred on grid 106, control passes to step 206, with a corresponding shutdown in step 210 in the event power has not been restored top grid 108. If failure on grid 106 has not occurred, control passes to step 224.

UPS 110 cannot operate indefinitely in the second power source failure state, which places UPS110 in a power standby condition. Accordingly, a minimum load on UPS 110 eventually does drain the power that is stored in UPS 110, but UPS 110 can typically endure on standby for a period of days. During the standby interval, controller 132 in step 224 continually determines on the basis of sense signals whether power to grid 108 or line 112 has been restored. If so, system 100 returns to the normal operational state of step 202, after first restoring the usual load on the "B" grid 108 in step 226. If not, the second power source failure state of step 220 continues until UPS 110 in step 228 produces a signal indicating that its power storage is substantially drained. at which time controller in step 230 implements an orderly shutdown procedure that is identical to step 210.

Those skilled in the art will appreciate that the functionality which is directly attributed to various components in the foregoing discussion may also be performed by other system components. For example, operations attributed to the second portion 130 of sense/switch circuitry 122 may be distributed in whole or in part to UPS 110. Similarly, operations attributed to controller 132 may be performed by embedded commands in the sense/switch circuitry 122, or by UPS 110.

The foregoing discussion is intended to illustrate the concepts of the invention by way of example with emphasis upon the preferred embodiments and instrumentalities. Accordingly, the disclosed embodiments and instrumentalities are not exhaustive of all options or mannerisms for practicing the disclosed principles of the invention. The inventors hereby state their intention to rely upon the Doctrine of Equivalents in protecting the full scope and spirit of the invention.

What is claimed is:

1. A system for use in supplying power to an electrical device fitted with power couplings for use in establishing contact with a first power source and a second power source in a normal operational state, comprising:
   an uninterruptible power supply in line between the second power source and the electrical device, the uninterruptible power supply not being in line between the first power supply and the electrical device;
   a switch for permitting the electrical device to consume power from a member of the group consisting of the first power source, the second power source, and combinations thereof;
   a first sense circuit for identifying a power failure condition in the first power source;
   a second sense circuit for identifying a power failure condition in the second power source; and
   a controller configured with control circuitry and logic and responsive to said first and second sense circuits to implement instructions to said switch for a plurality of operational states based upon a sensed power failure condition.

2. The system of claim 1, wherein the operational states include state selected from the group consisting of:
   a first power source failure state occurring when the first sense circuit senses a power failure condition in the first power source and the second sense circuit does not sense a power failure condition in the second power source, whereupon the switch circuit selects the second power source to provide power to the electrical device;
   a second power source failure state occurring when the second sense circuit senses a power failure in the second power source and the first sense circuit does not sense a power failure condition in the first power source, whereupon the switch selects the first power source to provide power to the electrical device and the uninterruptible power supply remains available to provide power if the first sense circuit senses a future power failure condition in the first power supply; and
   a dual source failure state occurring when the first sense circuit senses a power failure condition in the first power supply and the second sense circuit senses a power failure condition in the second power supply, whereupon the uninterruptible power supply provides power to the electrical device while the electrical device proceeds with an orderly shutdown; and combinations thereof.

3. The system as set forth in claim 2, wherein the uninterruptible power supply comprises means for providing a signal that notifies the controller of a power depletion condition in the uninterruptible power supply whenever the power depletion condition arises during the second power source failure state.

4. The system as set forth in claim 3, wherein the controller comprises means for responding to the signal by implementing an orderly shutdown of the electrical device.

5. The system as set forth in claim 1, wherein the controller includes logic for returning the system to the normal operational state in absence of the sensed power failure condition.

6. The system as set forth in claim 1, wherein the controller comprises distributed control circuitry and logic residing in the uninterruptible power supply and the electrical device.

7. A computer readable form use in adapting a system for use in supplying power to an electrical device fitted with power couplings for use in establishing contact with a first power source and a second power source in a normal operational state, where the system design includes:
   an uninterruptible power supply in line between the second power source and the electrical device, the uninterruptible power supply not being in line between the first power supply and the electrical device;
   a switch for permitting the electrical device to consume power from a member of the group consisting of the first power source, the second power source, and combinations thereof;
   a first sense circuit for identifying a power failure condition in the first power source;
   a second sense circuit for identifying a power failure condition in the second power source; and
   a controller;
   the computer readable form comprising machine instructions for inducing a plurality of operational states based upon sensed power failure conditions.

8. The computer readable form of claim 7, wherein the machine instructions are operable for inducing:
   a first power source failure state occurring when the first sense circuit senses a power failure condition in the first power source and the second sense circuit does not sense a power failure condition in the second power source, whereupon the switch selects the second power source to provide power to the electrical device, a second power source failure state occurring when the second sense circuit senses a power failure in the second power source and the first sense circuit does not sense a power failure condition in the first power source, whereupon the switch circuit selects the first power source to provide power to the electrical device and the uninterruptible power supply remains available to provide power if the first sense circuit senses a future power failure condition in the first power supply; and a dual source failure state occurring when the first sense circuit senses a power failure condition in the first power supply and the second sense circuit senses a power failure condition in the second power supply, whereupon the uninterruptible power supply provides power to the electrical device while the electrical device proceeds with an orderly shutdown.

9. The computer readable form as set forth in claim 7, comprising instructions for returning the system to the normal operational state in absence of the sensed power failure condition.

10. The computer readable form as set forth in claim 7, comprising instructions for distributed processing on control circuitry and logic residing in both the uninterruptible power supply and the electrical device.

11. The computer readable form as set forth in claim 7, comprising instructions for providing a signal that notifies the controller of a power depletion condition in the uninterruptible power supply whenever the power depletion condition arises during the second power source failure state.

12. The computer readable form as set forth in claim 11, comprising instructions for responding to the signal by implementing an orderly shutdown of the electrical device.

13. A method of operating a system in a plurality of operational states based upon sensed power failure conditions, where the system includes an uninterruptible power supply in line between a second power source and an electrical device, the uninterruptible power supply not being in line between a first power source and the electrical device;

a switch for permitting the electrical device to consume power from a member of the group consisting of the first power source, the second power source, and combinations thereof;

a first sense circuit for identifying a power failure condition in the first power source;

a second sense circuit for identifying a power failure condition in the second power source; and a controller;

the method comprising the steps of operating in a first power source failure state occurring when the first sense circuit senses a power failure condition in the first power source and the second sense circuit does not sense a power failure condition in the second power source, whereupon the switch selects the second power source to provide power to the electrical device, operating in a second power source failure state occurring when the second sense circuit senses a power failure in the second power source and the first sense circuit does not sense a power failure condition in the first power source, whereupon the switch selects the first power source to provide power to the electrical device and the uninterruptible power supply remains available to provide power if the first sense circuit senses a future power failure condition in the first power supply; and operating in a dual source failure state occurring when the first sense circuit senses a power failure condition in the first power supply and the second sense circuit senses a power failure condition in the second power supply, whereupon the uninterruptible power supply provides power to the electrical device while the electrical device proceeds with an orderly shutdown.

* * * * *